United States Patent [19]

Lawton

[11] Patent Number: 5,109,425
[45] Date of Patent: Apr. 28, 1992

[54] METHOD AND APPARATUS FOR PREDICTING THE DIRECTION OF MOVEMENT IN MACHINE VISION

[75] Inventor: Teri B. Lawton, La Crescenta, Calif.

[73] Assignee: The United States of America as represented by the United States National Aeronautics and Space Administration, Washington, D.C.

[21] Appl. No.: 251,500

[22] Filed: Sep. 30, 1988

[51] Int. Cl.$^5$ ............................................. G06K 9/00
[52] U.S. Cl. ........................................ 382/1; 358/105; 364/424.01; 382/22; 901/1
[58] Field of Search ............... 382/22, 1, 48, 43, 41; 358/105, 103, 142, 125; 901/1, 8, 46; 364/825, 724.1, 424.01, 424.02, 443, 444, 513

[56] References Cited

U.S. PATENT DOCUMENTS

| | | | |
|---|---|---|---|
| 3,772,516 | 11/1973 | Roberts et al. | 250/201 |
| 4,064,533 | 12/1977 | Lampe et al. | 358/105 |
| 4,257,703 | 3/1981 | Goodrich | 356/4 |
| 4,316,218 | 2/1982 | Gay | 358/125 |
| 4,405,949 | 9/1983 | Woolfson et al. | 358/93 |
| 4,409,661 | 10/1983 | Romanski | 364/516 |
| 4,443,855 | 4/1984 | Bishop et al. | 364/513 |
| 4,449,144 | 5/1984 | Suzuki | 358/105 |
| 4,539,590 | 9/1985 | Gage | 358/125 |
| 4,651,211 | 3/1987 | Weckowbrock et al. | 358/105 |
| 4,660,072 | 4/1987 | Fukinuki | 358/142 |
| 4,677,786 | 6/1987 | Kruger et al. | 358/111 |
| 4,692,069 | 9/1987 | Anderson et al. | 358/209 |
| 4,814,629 | 3/1989 | Arnold | 358/105 |
| 4,884,136 | 11/1989 | Ninomiya et al. | 358/105 |
| 4,885,631 | 12/1989 | Fukinuki et al. | 358/105 |
| 4,912,770 | 3/1990 | Seto et al. | 358/105 |

*Primary Examiner*—Joseph Mancuso
*Attorney, Agent, or Firm*—Thomas H. Jones; John R. Manning

[57] ABSTRACT

A computer-simulated cortical network computes the visibility of shifts in the direction of movement and computes: 1) the magnitude of the position difference between the test and background patterns, 2) localized contrast differences at different spatial scales analyzed by computing temporal gradients of the difference and sum of the outputs of paired even- and odd-symmetric bandpass filters convolved with the input pattern and 3) using global processes that pool the output from paired even- and odd-symmetric simple and complex cells across the spatial extent of the background frame of reference to determine the direction a test pattern moved relative to a textured background. The direction of movement of an object in the field of view of a robotic vision system is detected in accordance with nonlinear Gabor function algorithms. The movement of objects relative to their background is used to infer the 3-dimensional structure and motion of object surfaces.

27 Claims, 3 Drawing Sheets

# METHOD AND APPARATUS FOR PREDICTING THE DIRECTION OF MOVEMENT IN MACHINE VISION

ORIGIN ON THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to methods and apparatus employed in machine vision and, more particularly, to a machine vision system for determining movement in a 2-dimensional field of view comprising, video camera means for viewing the field of view and producing 2-dimensional binary representations of the pattern thereof at consecutive times $t_1$ and $t_2$; image enhancement means for receiving the 2-dimensional binary representations of the field of view and for producing enhanced 2-dimensional binary representations thereof; computational means for producing smoothed versions of the enhanced 2-dimensional binary representations, the computational means including means for filtering binary data comprising the enhanced 2-dimensional binary representations to provide the spatial gradients of components thereof comprising a background frame of reference and components identified with objects moving against the background frame of reference; means for producing the temporal gradients of the enhanced 2-dimensional binary representations; and, sensing means for comparing the spatial and temporal gradients at the consecutive times to one another to determine any motion parallax existing in the field of view, whereby movement of objects in the field of view is determined.

In the preferred embodiment, the outputs from paired Gabor filters summed across the background frame of reference are used by the sensing means to determine the direction of movement.

The preferred embodiment additionally includes, means for encoding the image intensity of the pattern of the field of view by separable spatial and temporal filters consisting of paired even-and odd-symmetric simple cells in quadrature phase; for each combination of the paired even- and odd-symmetric filters at each spatial scale being analyzed, means for passing the input signal through the spatial and temporal filters to produce four separable responses wherein the output from each spatial filter is processed during two different time intervals by a low-pass temporal filter and a bandpass temporal filter; and, means for taking the sums and differences of the outputs from the paired filters to produce spatiotemporally-oriented nonlinear responses that are selective for the direction of any motion.

In the preferred embodiment the separable spatial and temporal filters comprise:

an even-symmetric Gabor function, $F_{ES}$, described as, $$F_{ES}(f,x,\sigma^2) = \cos(2\pi f x) e^{-(x-x_0)^2/2\sigma^2}$$

and,
an odd-symmetric Gabor function, $F_{OS}$, described as, $$F_{OS}(f,x,\sigma^2) = \sin(2\pi f x) e^{31\ (x-x_0)^2/2\sigma^2}$$

, where f corresponds to the spatial-frequency of the pattern, x corresponds to the horizontal spatial position being examined, $x_0$ corresponds to the video camera means's fixation point, and $\sigma^2$ corresponds to the variability within the pattern's spatial period in locating the position of the most salient contrast difference, $x_0$.

Additionally, the low-pass temporal filter $F_{ES}$ is described by, $$\sum_{x=x_0-B/2}^{x=x_0+B/2} \frac{k_j C_b^n + k_{fb}}{C_b^n + C_o} F_{ES}^m \pm \frac{k_i C_t^n + k_{fi}}{C_t^n + C_o} F_{OS}^m \text{ at time } t_2$$

and the bandpass temporal filter $F_{OS}$ is described by, $$\sum_{x=x_0-B/2}^{x=x_0+B/2} \frac{k_j C_b^n + k_{fb}}{C_b^n + C_o} F_{ES}^m \pm \frac{k_i C_t^n + k_{fi}}{C_t^n + C_o} F_{OS}^m \text{ at time } t_1$$

, where $C_t$ corresponds to the contrast of a test pattern, $k_{ft}$ corresponds to the contrast threshold for a test frequency, $C_b$ corresponds to the contrast of the pattern of the background frame of reference, $k_{fb}$ corresponds to the contrast threshold for the spatial frequencies of the background frame of reference, $C_o$, that depends on the temporal frequency, is a constant that corresponds to the signal-to-noise ratio used when detecting left-right movement of a test pattern relative to of the background frame of reference, n corresponds to the slope of the contrast response function, m is a constant (usually 1 but may be 2 as a result of rectification which only occurs at high temporal frequencies), B corresponds to the spatial period of the background frame of reference, $x_0$ corresponds to a zero-crossing or contrast difference used as the point of reference to judge the direction the test pattern moved between two pattern presentations at times $t_1$ and $t_2$, and $k_i$, $k_j$ are changeable constants for the gain of the contrast sensitivity which may be changed by feedback.

BACKGROUND ART

In the field of robotics, and the like, it is often desirable to provide the equipment with an optical input device which will allow the equipment to "see" what it is doing and make adaptive control decisions based thereon. Such "machine vision" applications can generally be classified in one of two general categories—vision to control movement of a portion of the device with respect to a target area and vision to control movement of the device itself with respect to its surroundings. A robotic assembly device moving an arm with respect to an article being assembled thereby is an example of the first type while a robotic vehicle moving across an area is an example of the latter. Determining the direction an object moves relative to the observer is used to disambiguate objects from the background frame of reference. To navigate effectively, the optical flow of objects in the environment, relative to the observer, is used by both human and computer vision systems.

In machine vision it is frequently necessary to determine the direction of motion of an object in the field of view with reference to the background. This is especially necessary for machines that are themselves moving, such as planetary rovers, and the like. This capability is required because such movement is used to infer the 3-dimensional structure and motion of object surfaces. Apparent movement is perceived when an object appears at one spatial position and then reappears at a second nearby spatial position a short time later. For example, when two similar lights flash asynchronously against a dark background at night, the observer "sees" an apparent movement of one light. The shift in the spatial position of contrast differences (i.e. light against a dark background) over a short time interval induces the perception of motion. The direction an object is perceived to move is judged relative to a background frame of reference. Figure-ground segmentation precedes the determination of the direction of movement. When navigating through the environment, objects are perceived to move relative to a textured stationary background. Both the spatiotemporal characteristics of the object and the background frame of reference are used to determine the perceived direction of movement.

Prior art machine vision systems have been designed in a machine-like fashion; that is, they take what amounts to a "snapshot" of the scene, delay, take a second snapshot, and then compare the two to see what changes have taken place. From those changes, the appropriate movement calculations are made. A human operator performing the same control functions, on the other hand, takes a different approach. The human's predictive approach is one wherein the scene is viewed in real-time and the movement is divided into relevant and non-relevant areas. For example, when driving an automobile, the driver sees thing immediately in front of the vehicle (the foreground), at a median distance (a middle active region), and in the far distance (the background). When maneuvering the vehicle along the streets, the driver is only interested in the median distance as it provides the information which is relevant to the movement of the vehicle through the streets. The background is irrelevant except as it relates to movement towards an ultimate goal. Likewise, the foreground area immediately in front of the vehicle relates only to the avoidance of sudden obstacles. Thus, the driver rejects data from the field of view that does not relate to the immediate problem being solved, i.e. steering guidance. There is also a constant prediction of future movement and correction for changes from the prediction. In this way, the driver is able to quickly and accurately perform the necessary steering function from the visual data as input and processed. At present, there is no machine vision system which operates in the same manner as a human operator.

Visual psychophysics research has uncovered several important properties that determine the direction a simple object is seen to move when viewed by a human operator. The contrast, position or spatial-phase, the spatial frequencies, and the temporal duration that characterize the test object and its background affect the direction an object is perceived to move relative to its background. When identifying patterns where a test sinewave grating is shifted in position relative to a stationary textured background composed of single and multiple spatial-frequency components, the visibility of left-right movement was found to be predicted by spatially-located paired Gabor filters (paired even- and odd-symmetric filters optimally tuned to a 90° phase difference) summed across the background reference frame. The problem is to apply these discoveries so as to provide a similar ability to determine the direction of object movement in machine vision. The solution is to employ a computer-based, real-time system to process the image signals through paired Gabor filters, using the sums and differences to determine direction and, thereby, emulate the human response in a machine vision environment.

STATEMENT OF THE INVENTION

Accordingly, it is an object of this invention to provide a machine vision system which provides control information closely related to the information which would be processed by a human operator under similar circumstances.

It is another object of this invention to provide a machine vision control system which can control a robotic type device, or the like, in much the same manner as a human operator would manually perform the same control functions under similar circumstances.

It is yet another object of this invention to provide a machine vision control system for controlling robotic type devices, or the like, in a manner which eliminates unnecessary data from the computations so that the computations performed can be accomplished in real-time.

Other objects and benefits of this invention will become apparent from the description which follows hereinafter when taken in conjunction with the drawing figures which accompany it.

DETAILED DESCRIPTION OF THE INVENTION

This invention is built around a computer-simulated cortical network which computes the visibility of shifts in the direction of movement and computes: 1) the magnitude of the position difference between test and background patterns, 2) localized contrast differences at different spatial scales analyzed by computing temporal gradients of the difference and sum of the outputs of paired even- and odd-symmetric bandpass filters convolved with the input pattern and 3) using global processes that pool the output from paired even- and odd-symmetric simple and complex cells across the spatial extent of the background frame of reference to determine the direction a test pattern moved relative to a textured background. Magnocellular pathways are used to discriminate the direction of movement. Since magnocellular pathways are used to discriminate the direction of movement, this task is not affected by small pattern changes such as jitter, short presentations, blurring, and different background contrasts that result when the veiling illumination in a scene changes. For example, the direction of movement of an object in the field of view of a robotic vision system is detected by encoding image intensity by passing the input image through separable spatiotemporal filters consisting of a paired even- and odd-symmetric cells tuned to a 90° spatial-phase difference so as to produce paired signals processed through a low pass and a bandpass temporal filter whereby the sums and differences produce non-linear responses indicating direction of motion. The processing is accomplished by a neural network computer in accordance with non-linear Gabor function algorithms. Before beginning a detailed description of the invention itself, however, a description of the basis for human emulation incorporated therein will be provided.

As mentioned above, in human vision and the interpretation thereof, the movement of objects relative to their background is used to infer the 3-dimensional structure and motion of object surfaces. Apparent movement is perceived by the observer when an object appears at one spatial position and then appears at a second nearby spatial position a short time later. The shift in the spatial position of contrast differences over a short time interval induces the perception of movement. The direction an object is perceived to move is judged relative to the background frame of reference and figure-ground segmentation precedes the determination of the direction of movement. When navigating through the environment, objects are perceived to move relative to a textured stationary background. Both the spatiotemporal characteristics of the object and the background frame of reference are used to determine the perceived direction of movement. Studying the visibility of shifts in the direction a pattern moves relative to a background using discrete sequential flashed stimuli has the advantage of providing a more 'analytic' stimulus with which to separately manipulate the spatial and temporal aspects of movement. Optical flow, an important cue for navigation, is determined by measuring the rate of movement over time, divided by the rate of movement across space.

Figure 1:
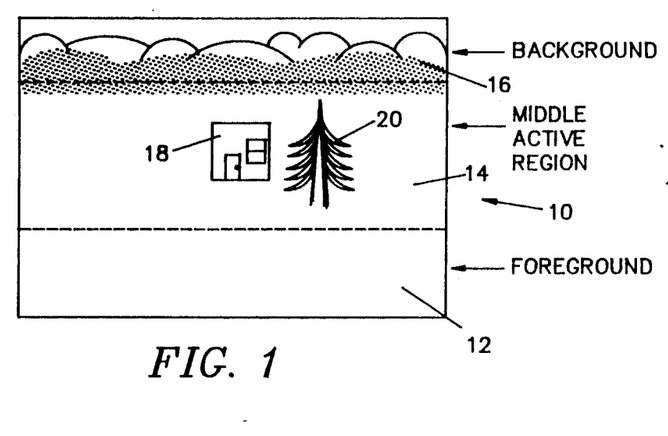
FIG. 1 is a simplified drawing of a typical scene as viewed by a machine vision system according to the present invention showing how the scene contains necessary and useful information within a horizontal strip which comprises a middle active region and contains unnecessary information in background and foreground areas.

The optical phenomenon upon which the invention is based is shown in simplified form in FIGS. 1-4. As a scene 10 is viewed, there is a natural tendency for the scene to fall into a foreground area 12 at the bottom, a middle region 14 which exists as a horizontal strip through the middle of the scene 10, and a background area 16 at the top. A human viewer will typically raise or lower his/her head in order to place the scene into this arrangement; that is, normally a driver, pilot, pedestrian, etc. will look towards an immediate goal in the middle distance in order to perform the primary guidance function and will only glance down to the foreground and up to the background periodically to perform the functions associated therewith. In FIG. 1, the middle area 14 contains a building 18 and a tree 20. The distance between the viewer and the building 18 and tree 20 are not readily apparent from a single view.

Likewise, the distance between the building 18 and the tree 20 are not readily apparent from a single view. If the viewer moved towards the building 18 and tree 20, they would grow in perceived size at different rates as a function of their respective distances. Certain decisions could be made therefrom. As the objects approached the viewer and were passed by the viewer, a different phenomenon would take place. It is that passing phenomenon that is of primary importance in machine vision and the one which will be addressed with particularity herein.

Figure 2:
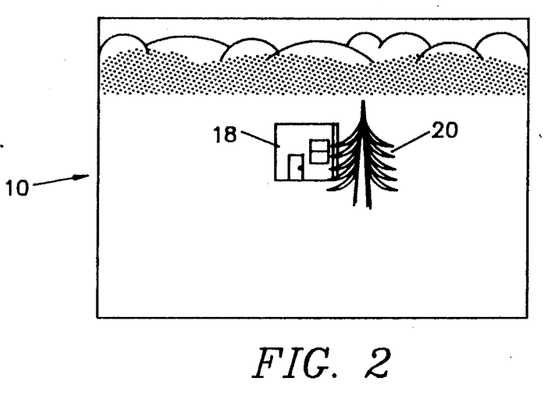
FIG. 2 is a simplified drawing showing how the features in the middle active section of FIG. 1 change relationship as a function of their distance from the viewer as the viewer moves past them.
Figure 3:
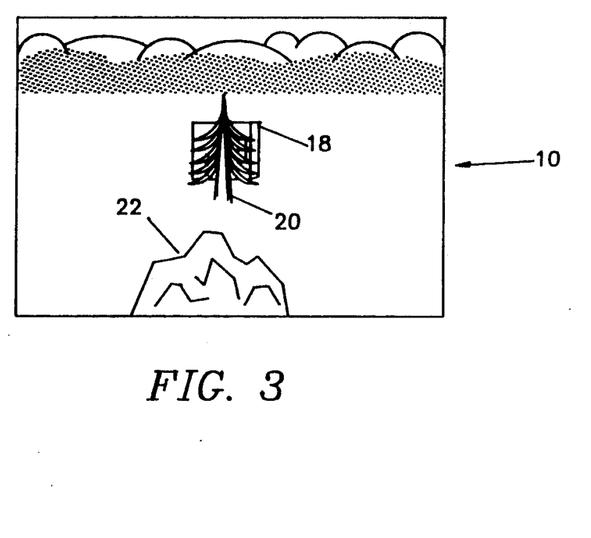
FIG. 3 is a simplified drawing further showing how the features in the middle active section of FIG. 1 change relationship as a function of their distance from the viewer as the viewer moves past them and how foreground items on non-interest appear and disappear from the scene.
Figure 4:
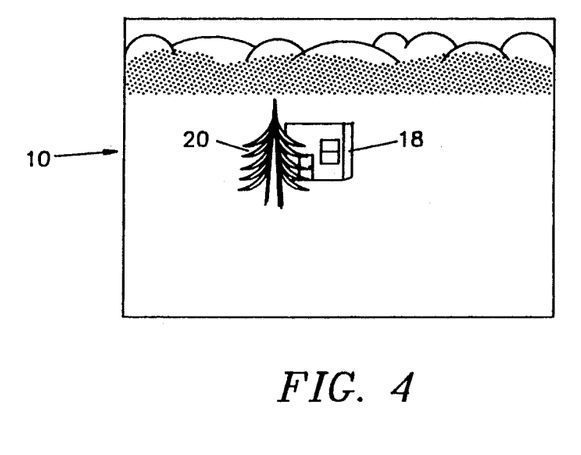
FIG. 4 is a simplified drawing showing how the features in the middle active section of FIG. 1 change relationship as a function of their distance from the viewer as the viewer moves past them at a later point in time from FIG. 3.

As shown in FIG. 2, as the viewer passes the building 18 and tree 20 the background area 16 and foreground area 12 remain constant while the building 18 and tree 20 move with respect to both the background area 16 and each other. It is this movement relationship which allows the scene 10 to be "mapped" into a 3-dimensional representation from the data gathered and, additionally, for the movement of the objects to be predicted. In FIG. 2, we perceive that the building 18 has moved to the left a small distance while the tree 20 has moved a greater distance. In FIG. 3, we again perceive that the building 18 has moved to the left a small distance while the tree 20 has moved a greater distance. Note also that a rock 22 has appeared within the scene 10. Since it is in the foreground area 12, however, it is not relevant to the mapping of the objects of interest (i.e. the building 18 and tree 20) and, therefore, all data relevant to the apparent "movement" thereof (which would be processed in a typical prior art system) can be discarded. Finally, in FIG. 4, we once again perceive that the building 18 has moved to the left a small distance while the tree 20 has moved a greater distance. From the data provided by the views of FIGS. 1-3, the view could have (and subconsciously would have) predicted the direction of movement and final position of FIG. 4. In the present invention, this is exactly what takes place; and, the difference between the predicted movement and actual movement is used to updata and correct the prediction algorithm employed.

Figure 5:
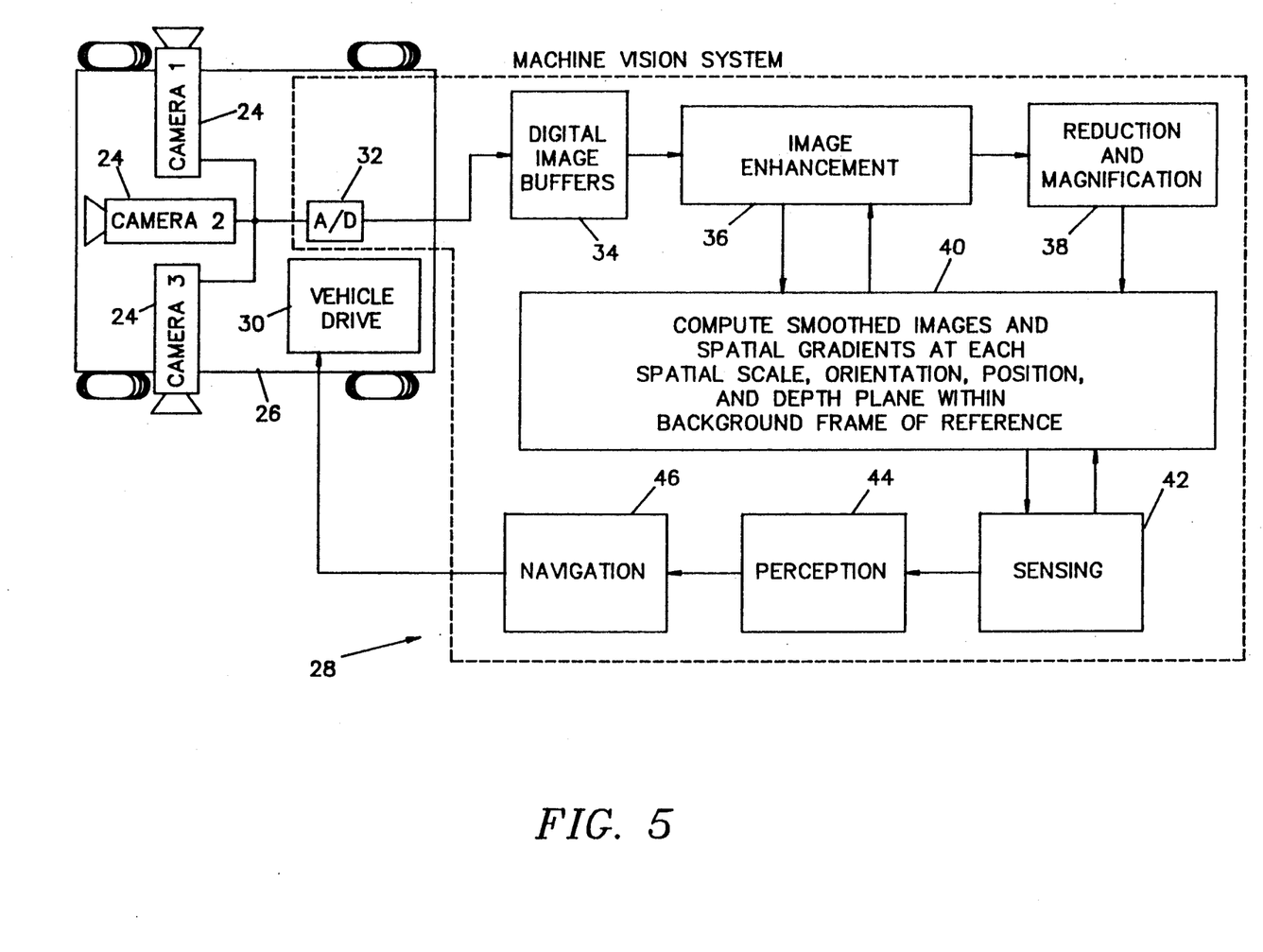
FIG. 5 is a functional block diagram of a machine vision system according to the present invention as mounted and tested on a planetary rover.

Machine vision can be used to enable a robotic vehicle to navigate safely in dangerous environments. The machine vision system of the present invention is employed for the tasks of sensing, perception, and navigation and analyzes the direction of objects moving relative to a background scene, by computing: 1) spatial and temporal gradients of the smoothed image at several spatial scales, orientations, and depth planes (preferably using the input from at least two cameras) that are summed across the background frame of reference, and 2) motion parallax computed by determining the direction of movement relative to the reference depth plane that includes the fixation point, and depth planes in front of and behind the reference plane. This is depicted in the functional block diagram of FIG. 5. FIG. 5 depicts the present invention as actually tested on a planetary rover at the Jet Propulsion Laboratory (JPL). As shown therein, three television cameras 24 were mounted on the vehicle 26 to provide a forward view and views to the two sides. The outputs from the three cameras 24 were connected as an input to the machine vision system 28. In the tested embodiment, the input to the vehicle drive 30 was not actually made as the purpose was to gather test data for visual analysis and verification. In actual use, the control input to the vehicle drive 30 from the machine vision system 28 as shown in FIG. 5 would be made to allow the machine vision system 30 to control the navigation of the vehicle 26.

As depicted in FIG. 5, the machine vision system 28 of the present invention has the output from the cameras 24 connected to an analog to digital converter 32 to provide digital output data which can be processed by digital computing logic. The digital data from the analog to digital convert 32 is stored in appropriate image buffers 34 (i.e. there is a buffer for each camera 24). The data within the buffers 34 is processed by image enhancement logic 36 which filters the image data to enhance the borders so as to improve the accuracy of the figure-ground segmentation. In other words, the foreground (ground) data is to be eliminated as being redundant to the immediate problem and, therefore, the accuracy of the segmentation of the data is an important factor. Again in this regard, it is important to remember that a major goal of this invention is the elimination of non-relevant computations so that the necessary computations can be performed in realtime. It should be noted as well that the preferred filter as employed herein utilizes the "Normalized Transfer Function" (NTF). A more detailed analysis and description of the use of the NTF in optical systems to improve object identification under adverse conditions can be found in a co-pending application of the inventor hereof entitled LOW VISION IMAGE ENHANCEMENT AID by Teri A. Lawton and Donald B. Gennery, Ser. No. 118,205, filed Nov. 5, 1987. The output from the image enhancement logic is input to reduction and magnification logic 38 and computational logic 40. The output from the reduction and magnification logic 38 is also input to the computational logic 40. The reduction and magnification logic 38 reduces or magnifies the size or density of the image to give multi-scale resolution at several orientations. The computational logic 40 computes smoothed images and spatial gradients at each spatial scale, orientation, position, and depth plane within the background frame of reference.

The output of the computational logic 40 interfaces with sensing logic 42 which is in a feedback relationship with the computational logic 40; that is, deviations between predicted movement and position and actual movement and position are fed back to the computational process to improve its accuracy in what can be loosely classed as a learning process which more nearly approximates the human approach to the problem, as desired. The output from the sensing logic 42 goes to perception logic 44 which constructs and updates a depth map of the scene being viewed using data with respect to the relationship of perceived "moving" objects in the manner of that described with respect to FIGS. 1-4. The output from the perception logic 44 (i.e. the active depth map) is input to and used by the navigational logic 46 to choose the best path to the desired goal. This navigational data can be input to the vehicle drive 30 to direct the vehicle 26 along a desired course to a desired goal or destination. In the case of a robotic assembly device, for example, the moving object being viewed might be a robotic arm which could be guided in the same manner by the navigational logic 46 to perform its assembly tasks.

Increasing the complexity of the scene and the amount of noise in the scene (as a result of fog, haze, or rain, for example) requires a larger number of spatial scales, orientations, depth planes, and different time intervals to be analyzed. The smoothed images and the corresponding spatial and temporal gradients of this machine vision system are computed using a distributed network with feedforward and feedback connections. This distributed network can be implemented at real-time frame rates using either high-speed digital hardware or analog resistive networks. The gains that change the signal-to-noise ratios when computing the direction of movement, 1) the sensitivity, $k_i$, and contrast threshold, $k_{ft}$, for the test pattern or object, 2) the sensitivity, $k_j$, and contrast threshold, $k_{fb}$, for the background frame of reference, 3) the width of the background frame of reference, B, and 4) the slope of the contrast transducer function n, are changed as a result of the feedforward and feedback connections as mentioned above and shown in the drawing figures as bi-directional arrows. The constant $k_O$ depends on the temporal frequency, increasing at high temporal frequencies. There are feedforward and feedback connections between: 1) the sensing logic 42 using figure-ground segmentation to determine the boundaries of objects moving relative to the background scene, 2) the determination of whether more pictures of the scene are needed as a result of low signal-to-noise ratios, and 3) the perception logic 44 used to update the depth maps. Different types of filtering are used to increase the visibility of moving object borders via feedforward and feedback connections between: 1) the image enhancement logic 36 to improve the accuracy of figure-ground segmentation, and 2) the sensing logic 42. For example, asymmetric bandpass filtering that boosts the amplitudes of the intermediate spatial-frequencies more than the lower spatial-frequencies, in proportion to an observer's contrast sensitivity losses, significantly improved word recognition and reading performance in observers having a reduced spatial resolution. The proposed machine vision system is based on psychophysical studies of the ability of human observers to discriminate direction of movement. The feedforward and feedback connections between visual areas provide a model of a distributed cortical neural network for discriminating optical flow. Optical flow, an important cue for navigation, is determined by measuring the rate of movement over time, divided by the rate of movement across space. Determining the direction an object moves relative to the observer is used to disambiguate objects from the background frame of reference. The background scene provides the frame of reference that is used when tracking moving objects for pattern recognition. Following perception of the scene, navigation is completed by choosing the path with the least obstacles to reach the destination.

In implementing an actual system according to the present invention, several factors (that increase the visibility of the direction of movement) to be considered in the design, parameterization, and implementation emerged:

1) as the spatial-phase difference (between the peak luminance of the test pattern relative to the background) increased from a minimum phase difference of 4° up to a maximum phase difference of 90°. Increasing the phase difference from 90° to 180° did not change the visibility of shifts in the direction of movement. Paired Gabor filters which are orthogonal filters tuned to a spatial-phase difference of 90°, i.e., are in quadrature phase, predict these results.

2) as the temporal duration was increased when measuring the minimum spatial-phase difference needed to discriminate the direction of movement. Yet, once the test and background spatial-frequencies differ in spatial-phase optimally (by 90°), then increasing the temporal frequency by decreasing: a) the duration of test and comparison patterns from 750 msec down to 50 msec (from 1.3 to 20 cyc/sec), or b) the duration between test and comparison patterns from 500 msec down to 50 msec (from 2 to 20 cyc/sec) did not change the contrast needed to discriminate the direction of movement, or c) increasing the temporal frequency up to 20 cyc/sec. To determine specificity it is important to present patterns that optimally activate the mechanisms being studied.

3) as the contrast of a low frequency background was increased from 0.5% to 2%. On the other hand, increasing the contrast of a single middle spatial-frequencies background from 1% to 16% significantly reduced the visibility of shifts in the direction of movement. However, if the background was composed of several middle spatial-frequencies that repeat over a wide 1° area, then increasing the effective contrast of the background from 0.6% to 20% did not reduce the visibility of shifts in the direction of movement. The contrast needed to discriminate the direction a test pattern moved, relative to a clearly visible wide background frame of reference are all low, averaging 1% contrast. Since increasing the contrast of the middle spatial-frequencies components of the background did not reduce the visibility of apparent movement, as found for backgrounds composed of a single spatial-frequency, then it is the wide spatial extent of the background (analyzed by global processes in the cortex), and not the individual background frequencies that provides the frame of reference that is used to discriminate the direction of movement.

4) when the test spatial-frequency was a harmonic of the background's fundamental frequency, that is, it repeats within the background frame of reference, as opposed to when the test frequency is not a higher harmonic of the background's fundamental frequency. Global contrast differences that correspond to the width of the textured background provide the frame of reference used to discriminate the direction of movement.

5) when the test pattern was shifted relative to a wide background, such as 6+7+8 cyc/deg that repeats over a 1° area, as opposed to being shifted relative to a narrow background, such as 6 cyc/deg that repeats over a 0.17° area. Contrast thresholds are low for twice as wide a range of spatial-frequencies (3 octaves as opposed to 1-½ octaves) when added to a wide background composed of middle spatial-frequencies, such as 6+7 cyc/deg, as opposed to when added to a single middle spatial-frequency background, such as 6 cyc/deg. All scales higher in spatial-frequency than the fundamental frequency of the background pattern are used to detect the test pattern to discriminate the direction the test pattern moves. The range of scales that is used to discriminate the direction of movement is determined by the fundamental frequency of the background, that is, by the width of the background frame of reference.

6) as the contrast of middle background spatial-frequencies (5+7+9 cyc/deg that repeats over a 1° area) are selectively reduced by placing a blur glass in front of the patterns. The global low frequency contrast differences within the background provide the frame of reference for discriminating movement. The higher component background spatial-frequencies are not as important for discriminating the direction of movement as is the wide frame of reference that corresponds to the spatial extent of the background.

Both the global analysis of groups of edges across the background frame of reference, and the localized computation of contrast differences by paired even- and odd-symmetric Gabor filters within the frame of reference are computed to determine the direction of movement. Both the spatial-frequency composition and the spatial extent of the interval over which the test and background patterns repeat changes the visibility of the direction of movement. The importance of spatial-frequency is related to the use of bandpass filtering by the channels used to detect different spatial-frequency components. The importance of spatial extent is related to the use of wide background frame of reference to improve the visibility of left-right movement discrimination. Only when discriminating movement relative to a multi-frequency background, instead of a background consisting of a single spatial-frequency, can the relative contribution of: 1) global contrast differences corresponding to the background frame of reference, as opposed to 2) localized contrast differences between individual frequency components be analyzed independently. The results that were found when using patterns that optimally activate direction-selective mechanisms indicate that the output of paired Gabor filters (in quadrature phase) are summed across the background frame of reference to discriminate the direction of movement.

Figure 6:
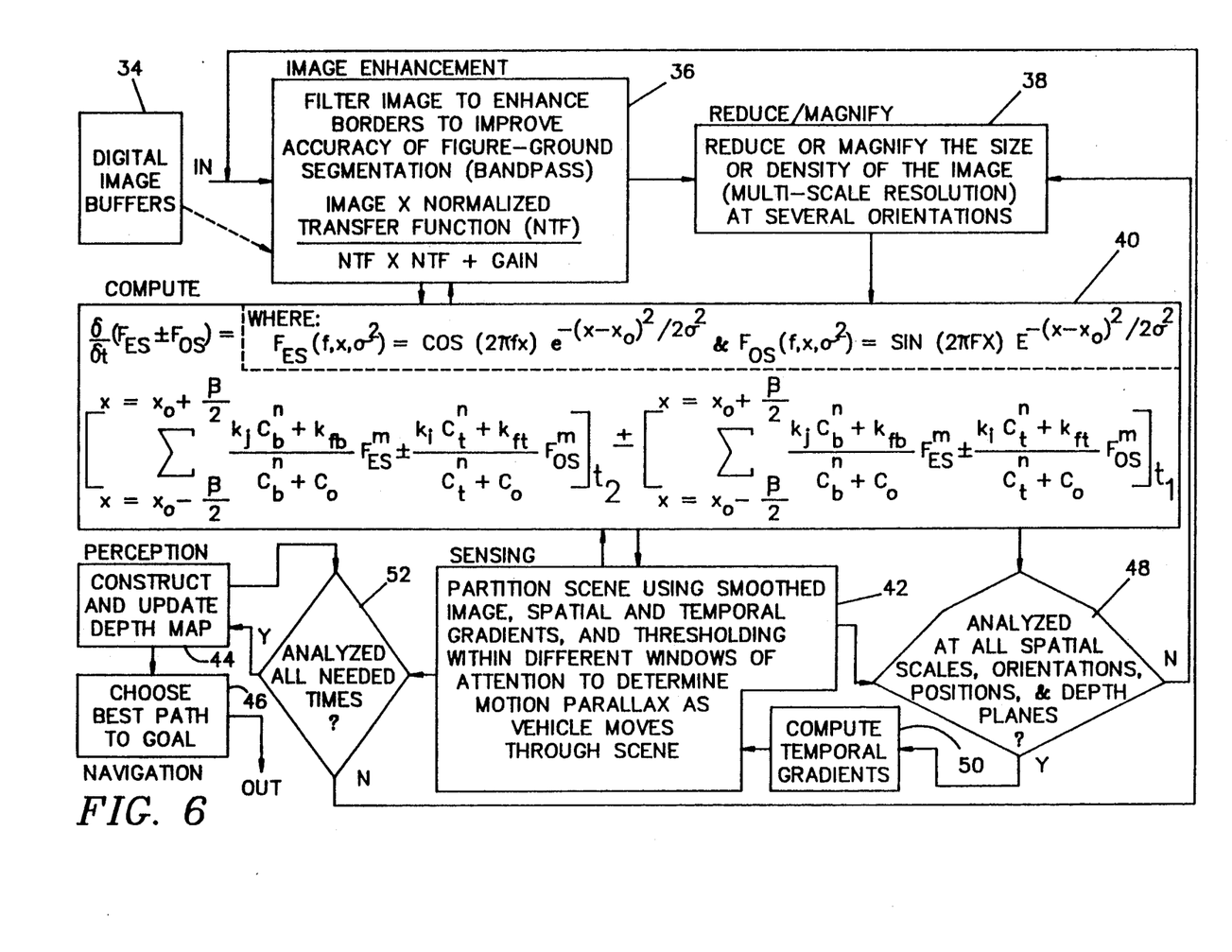
FIG. 6 is a flowchart of logic portions of the machine vision system of FIG. 5.

In the tested implementation of the present invention, as shown in FIGS. 5 and 6, the output from paired Gabor filters summed across the background frame of reference are used to determine the direction of movement. A pattern's image intensity is encoded by separable spatiotemporal filters, consisting of paired even- and odd-symmetric simple cells (bar and edge detectors) in quadrature phase, optimally tuned to a 90° spatial-phase difference. For each combination of paired even- and odd-symmetric filters at each spatial scale being analyzed, the input signal passes through the spatial and temporal filters to produce the four separable responses: each paired spatial filter being processed during two different time intervals by both 1) a low-pass temporal filter, and 2) a bandpass temporal filter optimally tuned to 10 cyc/sec. Sums and differences of paired filters in quadrature phase are taken to produce the spatiotemporally-oriented nonlinear responses that are selective for the direction of motion. The mathematical expressions that describe an even-symmetric Gabor function, $F_{ES}$, and an odd-symmetric Gabor function, $F_{OS}$, are:

$$F_{ES}(f,x,\sigma^2) = \cos(2\pi f x) e^{-(x-x_0)^2/2\sigma^2}$$

$$F_{OS}(f,x,\sigma^2) = \sin(2\pi f x) e^{-(x-x_0)^2/2\sigma^2}$$

where f corresponds to the spatial-frequency of the pattern, x corresponds to the horizontal spatial position being examined, $x_o$ corresponds to the observer's fixation point, and $\sigma^2$ corresponds to the variability within the pattern's spatial period in locating the position of the most salient contrast difference, $x_o$.

Gabor filters were chosen because the receptive fields of even-symmetric and odd-symmetric simple cells in the visual cortex that are used to discriminate the direction of movement can be characterized by Gabor filters. The Gabor filter is either a sine or a cosine multiplied times a Gaussian function. Gabor functions optimize resolution on a linear scale in both the spatial-position and spatial-frequency domains. Gabor functions optimize processing across space and over time. The Gaussian function acts as a spatially-localized smoothing function, significantly reducing the sensitivity of the cell as the pattern moves away from the center of the cell's receptive field. As the variance of the Gaussian filter is reduced: 1) the width of the sidebands of the even-symmetric filter is reduced relative to the center, and 2) the spatial-frequency bandwidth of the filter is reduced. Increasing the variance of the Gaussian filter increases the number of sidelobes that are encoded by the filter. The sine and cosine function of the Gabor filter acts like a bandpass spatial-frequency function that extracts the contrasts at each spatial position being examined. An even-symmetric filter computes the smoothed contrast at each spatial position being examined, whereas an odd-symmetric filter computes the corresponding contrast difference or spatial gradient. Therefore, by examining the output from paired even- and odd-symmetric Gabor filters, both the smoothed contrast at each spatial position being examined and the corresponding spatial gradients are computed. The spatially-localized paired sine and cosine functions enable the position of contrast differences to be measured using the smallest number of channels. Paired Gabor filters provide an encoding scheme for the visual cortex which maximizes signal-to-noise ratios given a fixed number of neurons. The need for paired even- and odd-symmetric filters to predict the direction of movement is also indicated by psychophysical data that found increasing the position difference between the peak luminance of test and background patterns from a minimum phase difference, up to 90°, increased the visibility of the shifts in the direction of movement, and any larger phase difference did not affect movement discrimination.

For test and background patterns having peak luminances that differ in position by 90°, an even-symmetric filter would be used to detect the background, and an odd-symmetric filter would be used to detect the direction the test grating moved relative to the background. As mentioned previously, by examining the output from paired even- and odd-symmetric Gabor filters, both the smoothed contrast at each spatial position being examined and the corresponding spatial gradients are computed. Many prior art computational models that predict movement implement a smoothing operation over the moving object and then compute the spatial and temporal gradients of the smoothed object. These models, like those proposed to account for movement discrimination for simple patterns, do not take into account the importance of: 1) paired even- and odd-symmetric filtering functions, 2) global contrast differences that correspond to the background frame of reference, 3) a nonlinear contrast response, and 4) the spatial and temporal thresholds that are inherent when computing spatial and temporal gradients. Therefore, these prior art computational models cannot and do not incorporate all of the psychophysical results that must be accounted for by a robust model that predicts direction of movement.

Previous models that propose that paired Gabor filters be used to predict the direction of movement are extended and made practical and useful for actual use in a real-time control environment in the present invention by including: 1) threshold mechanisms dependent on a pattern's spatial and temporal frequencies, 2) a nonlinear contrast transducer function, and 3) summing the outputs of the difference and sum of paired even- and odd-symmetric filters over the background's spatial extent, which provides the frame of reference used to judge the direction of movement at all spatial scales that are higher in spatial-frequency than the background's fundamental frequency.

The direction a pattern moves relative to its background at two different times is discriminated whenever the output from mechanisms that compute the difference and sum of paired even- and odd-symmetric bandpass channels pooled across the background frame of reference exceeds threshold. The model shown with particularity in the computational logic block 40 of FIG. 6 is employed to predict the visibility of shifts in the direction a pattern (detected by temporal bandpass $F_{OS}$) moves relative to a multi-frequency background (detected by temporal lowpass $F_{ES}$). In particular, there is the $F_{ES}$ term, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m$$

at time $t_2$ plus and minus the $F_{OS}$ term, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m$$

at time $t_1$, where $C_t$ corresponds to the contrast of the test pattern, $k_{ft}$ corresponds to the contrast threshold for the test frequency, $C_b$ corresponds to the contrast of the background pattern, $k_{fb}$ corresponds to the contrast threshold for the background frequencies, $C_o$, that depends on the temporal frequency, is a constant that corresponds to the signal-to-noise ratio used when detecting left-right movement of a test pattern relative to the background, n corresponds to the slope of the contrast response function (usually n is approximately 2 since the contrast response functions of simple and complex cells in the striate cortex are rectified), m usually is 1 but sometimes equals 2 as a result of rectification which only occurs at high temporal frequencies, B corresponds to the spatial period of the background frame of reference, $X_o$ corresponds to the zero-crossing or contrast difference that the observer uses as the point of reference to judge the direction the test pattern moved between the two pattern presentations $t_1$ and $t_2$, and $k_i$, $k_j$ are constants for the gain of the contrast sensitivity that is changed by feedback. The difference and sum of paired even- and odd-symmetric filters are summed across the background frame of reference, and then differenced at times $t_2$ and $t_1$ to discriminate the direction of movement. Suppose the observer is practiced and has stored a template of the phase-shifted test pattern. Then, only one temporal interval is needed to identify the direction of movement by using the texture pattern of contrast differences. However, the output from both temporal intervals must be compared to identify the direction of movement using the lowest contrasts possible.

As shown in the logic flowchart of FIG. 6, the logic flow from the computational logic 40 is to query block 48 where the logic determines if the analysis performed by the computational logic 40 has been performed at all spatial scales, orientations, positions, and depth planes provided for. If not, the logic flow returns to the reduction and magnification logic 38 and the computational logic 40 to perform such additional image orientations and computations. When the task is complete, the temporal gradients of the data are computed at block 50 and the logic flow moves to the sensing logic 42. Note that in the feedforward/feedback approach of the present invention, if additional data of a scene is required for the sensing logic to perform its function, the logic may transfer control back to query block 48 to determine if all possible data is present. When the sensing logic 42 finishes its task with respect to the data of a particular view, it transfers control to query block 52 where the logic determines if all the views required to construct and/or update a useful depth map have been analyzed. In other words, a single view does not provide sufficient data on the field of view upon which a 3-dimensional interpretation can be made. The analysis process is accomplished for the number of views required to provide sufficient data on the relative movement of the objects (as in the simplified drawings of FIGS. 1-4) such that a meaningful depth map can be constructed (or updated) from that data. Until that point is reached, the logic flow returns to the image enhancement logic 36 to process the next view from the cameras 24 as input to the digial input buffers 34. When enough data is present, query block 52 transfers control to perception logic 46.

To compute the direction a test pattern moves relative to a multi-frequency background, the difference and sum of the output of paired Gabor filters computed during each of the temporal intervals being examined must be computed and compared. Leftward movement is signaled by the difference between the outputs of paired even- and odd-symmetric functions, whereas rightward movement is signaled by the sum of the outputs of paired even- and odd-symmetric filters. Left-right movement at one spatial position is discriminated when the difference or sum of paired even- and odd-symmetric filters at time $t_1$ differs significantly from the difference or sum at time $t_2$. Squaring the output of paired filters introduces a component at the difference frequency, which plays an important role in discriminating the direction of movement. The sign of the temporal gradient will determine whether the test pattern moved to the right or moved to the left of the background's peak luminance.

The contrast of each pattern component is detected using filters tuned to spatial-frequencies having a bandwidth of 1 to 1½ octaves. A hyperbolic contrast response function, which optimally characterizes the contrast transducer function of normal observers and simple and complex cells in the striate cortex, is used to predict the minimum contrast needed to discriminate the direction of movement. The hyperbolic contrast transducer function is a nonlinear function that contains both a nonlinear power function for the contrast of the test pattern, $C^n$, and thresholding factors, $C_o$, $K_{ft}$, and $K_{fb}$.

The model employed in a system according to the present invention to discriminate direction of movement predicts psychophysical results; that is, the model predicts that the output of odd-symmetric filters relative to paired even-symmetric filters will increase as the spatial-phase difference increases, up to 90°. There is a trade-off in: 1) the phase difference between test and background patterns, and 2) the contrast of the test frequency that is needed to discriminate the direction of movement. As the spatial-phase difference is increased up to 90°, smaller contrasts are needed to discriminate the direction of movement. There is both a minimum spatial position and a minimum temporal duration that is needed to discriminate the direction a pattern moves relative to the background. Movement discrimination requires that the relative activation of both the test and background patterns, as measured by the output of paired Gabor filters (optimally tuned to 90° spatial-phase differences), be above threshold.

When the contrast of the background frame of reference is above threshold and below the saturation level of its contrast response function, for example from 0.6% to 20%, then the visibility of the direction of movement is not changed by the contrast of the background. The model proposed above predicts this result since at each temporal interval, the output of odd-symmetric filters, which compute the spatial gradient at each position being examined, is both summed and differenced from paired even-symmetric filters that are activated by the background frame of reference. As long as the difference between the sum and difference of the output of paired Gabor filters is greater than a threshold amount, then the direction of movement is discriminated. The contrast threshold for the test frequency is independent of the contrast of a suprathreshold background since $(C_b+C_t)+(C_b-C_t)=2C_t$.

The background pattern composed of spatial-frequencies combined in cosine phase acts as the frame of reference to judge the direction a pattern moves relative to a multi-frequency background. Since the low fundamental frequency of the background is more important than the higher component spatial-frequencies, this indicates that the multi-frequency background that repeats over a wide 1° area operates like a low-pass filter. The increased visibility of the direction of movement when judged relative to a wide as opposed to a narrow background frame of referencehas been found psychophysically. In addition, the direction of movement is visible at lower contrasts when the test spatial-frequency is a harmonic of the background spatial-frequencies; that is, when it repeats within the background frame of reference, compared to when the test and background frequencies are not harmonically-related. The low-pass filtering which determines the background frame of reference is represented in the model as the sum across the spatial period of the background, B, of the output of the difference and sum of paired Gabor filters, at all spatial scales that are an integral multiple of the background's fundamental frequency. The most salient contrast differences, $x_o$, are identified and used as a point of reference within the background frame of reference to judge the direction a pattern moves relative to a multi-frequency background.

It has been found through testing that discriminating the direction of movement is a task determined in the human cortex by paired even-symmetric and odd-symmetric simple cells consisting of excitatory and inhibitory subfields. In the present invention, a simulated neural network is used to discriminate the direction of movement in like manner. Finding that the receptive fields of even- and odd-symmetric simple cells vary in size allows for the coding of an image at different spatial scales. There are cells tuned to all different spatial-phase angles; however, paired even- and odd-simmetric simple cells in visual area V1 of the cortex are optimally tuned to a spatial-phase difference of 90°. These psychophysical results are consistent with visual psychophysics studying the direction a test pattern moved relative to simple and multi-frequency backgrounds. Both 1) the center phase did not change the visibility of the direction of movement, only the phase difference changed an observer's sensitivity for discriminating the direction of movement, and 2) the visibility of shifts in the direction of movement was optimally tuned to a phase difference of 90°.

The neural network used to discriminate the direction of movement that is suggested by psychophysical and neurophysiological data is that the output of paired even- and odd-symmetric simple and complex cells in the visual cortex activated by both local and global contrast differences are used to discriminate the direction of shifts in the positions of contrast differences over time. Recent physiological data found a nonlinear output response from X-like cells in the Lateral Geniculate Nucleus (LGN) and complex cells in the striate cortex that corresponds to the difference frequency of a compound grating. A difference in spatial-frequency between the test and background is needed to discriminate the direction of movement, as found in the inventor's laboratory and others. The nonlinear component that corresponds to the amplitude of the output at the difference frequency can be predicted as a result of rectification (a squaring of the output response). The output of cortical cells are nonlinear, primarily due to: 1) thresholds that must exceed the spontaneous cortical activity, 2) rectification of the output response, 3) changes in the gain, such as those found following contrast adaptation, and 4) saturation of the contrast response working range. All of these nonlinearities are incorporated in the model utilized in the tested embodiment of the present invention. The outputs of paired even- and odd-symmetric simple cells at different spatial scales are squared as a result of rectification. The sum and difference of the outputs of paired cells, implemented by pairs of simple cells having opposite polarity, are summed across the background frame of reference. Low frequency contrast differences corresponding to the background frame of reference provide the fundamental scale that is used to compute the direction of movement. The contrast differences induced by the position difference between test and background gratings are computed at all spatial scales tuned to spatial-frequencies equal to and higher than the background's fundamental frequency.

To test the basis of the present invention, a simulated neural network that computes the visibility of shifts in the direction of movement was constructed and tested. That network computed: 1) the magnitude of the position difference between the test and background patterns, 2) localized contrast differences at different spatial scales analyzed by computing temporal gradients of the difference and sum of the output of paired even- and odd-symmetric bandpass filters convolved with the input pattern, and 3) using global processes that pool the output from paired even- and odd-symmetric simple and complex cells across the spatial extent of the background frame of reference. Evidence was gained that magnocellular pathways are used to discriminate the direction of movement using patterns that optimize an observer's ability to discriminate the direction a pattern moved relative to a textured background. Since magnocellular pathways are used to discriminate the direction of movement, the task is not affected by small pattern changes such as jitter, short presentations, blurring, and different background contrasts that result when the veiling illumination in a scene changes.

GENERATION OF DEPTH MAPS

The generation of a depth map is an important aspect of the method of the present invention when performing under actual operating conditions (as described briefly with respect to the perception logic 42 of FIGS. 5 and 6). There are several approaches for generating depth maps: 1) stereo correlation that uses the disparity between the same image in the scene recorded from two different perspectives at the same time, 2) active ranging that emits wave patterns, either laser, microwave, or sound, and determines the time for the signal to return after hitting each object of interest in the scene, and 3) motion parallax that measures the velocity gradients between different points in the scene (as described with respect to FIGS. 1-4). Both stereo correlation and active ranging require static images for matching to construct the depth map of a scene, whereas, motion parallax requires dynamic images. Thus, motion parallax is the only technique that is useful for constructing and updating the depth map of a scene while the vehicle is in motion. When the vehicle is not moving and static images must be used to construct the depth map, stereo correlation is preferred to active ranging because: 1) it is not emissive, and 2) it has much simpler hardware requirements, and 3) has much better near field resolution. With stereo matching, the resolution decreases in proportion to the square of the distance. Using motion parallax, distant objects can be ranged at high resolution by recording images along distances orthogonal to the line of sight being used to generate the depth map. Moving the vehicle over a longer distance is equivalent to increasing the baseline between the stereo cameras, increasing the amount of disparity between pictures at far distances. Thus, both close and distant objects can be ranged at high resolution when motion parallax is used to construct the depth map. In addition, motion parallax has much simpler hardware requirements than either stereo correlation and active ranging methods, since motion parallax requires only one camera to analyze the scene.

The system of this invention in its tested embodiment determines the 2-dimensional position and size of objects and uses motion-parallax to convert them into a 3-dimensional depth map in the perception logic 46. A sequence of video images taken at small distance intervals by horizontally scanning a natural scene using cameras mounted on the current Mars Rover prototype (in the manner of FIG. 5) was used to measure motion parallax or translational movement of the scene. The depth map was constructed from this sequence of video images by algorithms implemented on a VAX computer. The creation of the depth map and the continuous estimation of the vehicle motion was accomplished by scene analysis using paired even- and odd-symmetric filters that are normalized Gabor filters (a cosine times a Gaussian and a sine times a Gaussian), as described earlier herein. the even- and odd-symmetric filters are oriented filters that compute both the smoothed contrast and the corresponding spatial gradient at each spatial position. Thus, these paired filters provided two independent measures of the contrast differences in the scene. These paired filters were computed at several orientations and resolutions (spatial scales) using a coarse-to-fine matching procedure. The filters are oriented orthogonal to the direction of vehicle movement. In performing this operation, the scene is scanned until the first suprathreshold contrast difference (which denotes an object boundary) is found before determining the object map that is used to compute motion parallax. The amount an object's position is shifted between each scene is used to determine the motion parallax that is then used to partition the scene into objects at different depths. Thresholding of the outputs of the paired filters analyzing the same object in different scenes is used for the matching. Thus, intelligent matching instead of exhaustive matching is used. This is important for real-time applications as it reduces the amount of computing (and, therefore, time that is consumed). The depth map is constructed using oriented paired filters analyzed over different windows of attention, determined by different object widths, across the scene. Thus, an area-based approach is used to partition the scene into objects at different depths using oriented filters. The paired even-and odd-symmetric filters include a nonlinear contrast transducer function that incorporates gain and threshold changes induced by different scene parameters, such as illumination, to normalize the output of the paired filters. For each object, the location that produces the maximum output of paired even- and odd-symmetric filters at low resolutions (implemented using lowpass filtering) is used to determine the width of the object. Higher spatial scales are used for verification. A depth map is then constructed using regions of constant velocity to construct each object's height and width, and changes in the direction of movement relative to the vehicle and other objects to infer the position of these objects in a three-dimensional scene. The closer the object is to the camera, the larger the distance transversed by the object in each video image of the scene, as described with respect to the simplified drawings of FIGS. 1–4. The depth map is constructed by analyzing the scene that is closest to the vehicle's cameras before analyzing higher elevations. This is because closer objects move farther than and can occlude more distant objects. The depth map is updated by minimizing deviations from expected changes in object boundaries at different depths over time. This approach takes into account several important parameters in the matching procedure such as the occlusion of far objects by closer objects, the clustering of moving images at the same depth, and the relative movement of objects at different depths as one views the scene from different perspectives, that should be used by a robotic vision system that constructs three-dimensional depth maps from two-dimensional luminance differences.

Stereo correlation and active ranging techniques for constructing a depth map for robotic vehicles and telerobots rely on static images. Constructing depth maps for robotic vision using motion parallax that relies on dynamic images provides the following advantages:

able to continually update the depth map and maintain knowledge of the vehicle's motion as it moves through the environment on a real-time basis.

requires only one camera to construct the depth map, if necessary.

paired filters are computationally efficient across space and over time; they optimize resolution and signal-to-noise ratios across space and over time in both the frequency and spatial-temporal domain ($\Delta x \Delta f > \frac{1}{2}$ and $\Delta t \Delta f > \frac{1}{2}$).

uses intelligent matching based on thresholding, instead of exhaustive matching.

uses both area-based and feature-based matching; (area-based approaches have difficulty with man-made objects, feature-based approaches have difficulty with natural terrains).

filters are based on biological filters used for (natural) movement discrimination by human observers.

both close and distant objects can be ranged at high resolution.

the filters analyzing the scene are robust for different scene parameters (for example different scene illuminations).

provides economical and robust means to continually update depth map during vehicle motion.

designed using a structured hierarchical, parallel, and interactive (feedforward and feedback) approach to verify and update the depth map of the scene.

I claim:

1. A machine vision system for determining movement in a 2-dimensional field of view comprising:

a) video camera means for viewing the field of view and producing 2-dimensional binary representations of the pattern thereof at consecutive times $t_1$ and $t_2$;

b) image enhancement means for receiving said 2-dimensional binary representations of the field of view and for producing enhanced 2-dimensional binary representations thereof;

c) computational means for producing smoothed versions of said enhanced 2-dimensional binary representations, said computational means including means for filtering binary data comprising said enhanced 2-dimensional binary representations to provided the spatial gradients of components thereof comprising a background frame of reference and components identified with objects moving against said background frame of reference;

d) means for producing the temporal gradients of said enhanced 2-dimensional binary representations; and, e) sensing means for comparing said spatial and temporal gradients at said consecutive times to one another to determine any motion parallax existing in the field of view, whereby movement of objects in the field of view is determined.

2. The machine vision system of claim 1 wherein:

the outputs from paired Gabor filters summed across said background frame of reference are used by said sensing means to determine the direction of movement.

3. The machine vision system of claim 1 and additionally including:

a) means for encoding the image intensity of said pattern of the field of view by separable spatial and temporal filters consisting of paired even- and odd-symmetric simple cells in quadrature phase;

b) for each combination of said paired even- and odd-symmetric filters at each spatial scale being analyzed, means for passing the input signal through said spatial and temporal filters to produce four separable responses wherein the output from each said spatial filter is processed during two different time intervals by a low-pass temporal filter and a bandpass temporal filter; and, c) means for taking the sums and differences of the outputs from said paired filters to produce spatiotemporally-oriented nonlinear responses that are selective for the direction of any motion.

4. The machine vision system of claim 3 wherein:

said paired even- and odd-symmetric simple cells in quadrature phase are tuned to a 90° spatial-phase difference.

5. The machine vision system of claim 3 wherein said separable spatial and temporal filters comprise:
a) an even-symmetric Gabor function, $F_{ES}$, described as, $$F_{ES}(f,x,\sigma^2) = \cos(2\pi f x) e^{-(x-x_0)^2/2\sigma^2};$$

and,
b) an odd-symmetric Gabor function, $F_{OS}$, described as, $$F_{OS}(f,x,\sigma^2) = \sin(2\pi f x) e^{-(x-x_0)^2/2\sigma^2}$$

, where f corresponds to the spatial-frequency of said pattern, x corresponds to the horizontal spatial position being examined, $x_o$ corresponds to said video camera mean's fixation point, and $\sigma^2$ corresponds to the variability within said pattern's spatial period in locating the position of the most salient contrast difference. $x_o$.

6. The machine vision system of claim 3 and additionally including:
means for discriminating the direction an object in said pattern moves relative to said background frame of reference at two different times whenever an output from said means for taking the sums and differences of outputs from said paired filters pooled across said background frame of reference exceeds a pre-established threshold.

7. The machine vision system of claim 3 wherein:
a) said low-pass temporal filter $F_{ES}$ is described by, $$\sum_{x=x_0-B/2}^{x=x_0+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_2$$

b) and said bandpass temporal filter $F_{OS}$ is described by, $$\sum_{x=x_0-B/2}^{x=x_0+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_1$$

, where $C_t$ corresponds to the contrast of a test pattern, $k_{ft}$ corresponds to the contrast threshold for a test frequency, $C_b$ corresponds to the contrast of the pattern of said background frame of reference, $k_{fb}$ corresponds to the contrast threshold for the frequencies of said background frame of reference, $C_o$, that depends on the temporal frequency, is a constant that corresponds to the signal-to-noise ratio used when detecting left-right movement of a test pattern relative to of said background frame of reference, n corresponds to the slope of the contrast response function, m is a constant, B corresponds to the spatial period of said background frame of reference, $x_o$ corresponds to a zero-crossing or contrast difference used as the point of reference to judge the direction said test pattern moved between two pattern presentations at times $t_1$ and $t_2$, and $k_i$, $k_j$ are changeable constants for the gain of the contrast sensitivity which may be changed by feedback.

8. The machine vision system of claim 1 wherein said video camera means comprises:
a) a video camera having an input lens for viewing an area of interest and producing an analog signal at an output thereof reflecting a 2-dimensional area of interest being viewed by said input lens;
b) analog to digital conversion means connected to said output of said video camera for converting said analog signal into a binary signal; and,
c) digital buffer means for storing said binary signal.

9. In a machine vision system including a video camera having an input lens for viewing an area of interest and producing an analog signal at an output thereof reflecting a 2-dimensional area of interest being viewed by the input lens, an analog to digital converter connected to the output of the video camera for converting the analog signal into a binary signal, a digital buffer for storing the binary signal, and logic for analyzing the binary signal at times t1 and t2 to provide information about the contents of the area of interest, the method for determining movement in the area of interest comprising the steps of:
a) filtering the binary signal from the digital buffer at times $t_1$ and $t_2$ to produce enhanced 2-dimensional binary representations of the area of interest at the times;
b) producing smoothed versions of the enhanced 2-dimensional binary representations;
c) processing the enhanced 2-dimensional binary representations to provided the spatial gradients of components thereof comprising a background frame of reference and components identified with objects moving against the background frame of reference;
d) producing the temporal gradients of the enhanced 2-dimensional binary representations; and,
e) comparing the spatial and temporal gradients at times $t_1$ and $t_2$ to one another to determine any motion parallax existing in the area of interest, whereby movement of objects in the area of interest is determined.

10. The method of claim 9 and additionally including the steps of:
a) summing the outputs from paired Gabor filters across the background frame of reference; and,
b) using the summed output to determine the direction of movement.

11. The method of claim 9 and additionally including the steps of:
a) encoding the image intensity of the pattern of the area of interest by separable spatial and temporal filters consisting of paired even- and odd-symmetric simple cells in quadrature phase;
b) for each combination of the paired even- and odd-symmetric filters at each spatial scale being analyzed, passing the input signal through the spatial and temporal filters to produce four separable responses wherein the output from each the spatial filter is processed during two different time intervals by a low-pass temporal filter and a bandpass temporal filter; and,
c) taking the sums and differences of the outputs from the paired filters to produce spatiotemporally-oriented nonlinear responses that are selective for the direction of any motion.

12. The method of claim 11 and additionally including the step of:
tuning the paired even- and odd-symmetric simple cells in quadrature phase to a 90° spatial-phase difference.

13. The method of claim 11 wherein the separable spatial and temporal filters comprise:
  a) an even-symmetric Gabor function, $F_{ES}$, described as, $$F_{ES}(f,x,\sigma^2) = \cos(2\pi f x) e^{-(x-x_0)^2/2\sigma^2};$$

and,
  b) an odd-symmetric Gabor function, $F_{OS}$, described as, $$F_{OS}(f,x,\sigma^2) = \sin(2\pi f x) e^{-(x-x_0)^2/2\sigma^2}$$

, where f corresponds to the spatial-frequency of the pattern, x corresponds to the horizontal spatial position being examined, $x_o$ corresponds to the video camera mean's fixation point, and $\sigma^2$ corresponds to the variability within the pattern's spatial period in locating the position of the most salient contrast difference, $x_o$.

14. The method of claim 11 and additionally including the step of:
  discriminating the direction an object in the pattern moves relative to the background frame of reference at two different times whenever the sums and differences of outputs from the paired filters pooled across the background frame of reference exceeds a pre-established threshold.

15. The method of claim 11 wherein:
  a) the low-pass temporal filter $F_{ES}$ is described by, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_2$$

b) and the bandpass temporal filter $F_{OS}$ is described by, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_1$$

, where $C_t$ corresponds to the contrast of a test pattern, $k_{ft}$ corresponds to the contrast threshold for a test frequency, $C_b$ corresponds to the contrast of the pattern of the background frame of reference, $k_{fb}$ corresponds to the contrast threshold for the frequencies of the background frame of reference, $C_o$, that depends on the temporal frequency, is a constant that corresponds to the signal-to-noise ratio used when detecting left-right movement of a test pattern relative to of the background frame of reference, n corresponds to the slope of the contrast response function, m is a constant, B corresponds to the spatial period of the background frame of reference, $x_o$ corresponds to a zero-crossing or contrast difference used as the point of reference to judge the direction the test pattern moved between two pattern presentations at times $t_1$ and $t_2$, and $k_i$, $k_j$ are changeable constants for the gain of the contrast sensitivity which may be changed by feedback.

16. The method of claim 15 and first additionally including determining the direction a test pattern moves relative to a multi-frequency background by the steps of:
  a) computing and comparing the difference and sum of the output of paired Gabor filters during each of a pair of temporal intervals being examined;
  b) establishing leftward movement by the difference between the outputs; and,
  c) establishing rightward movement by the sum of the outputs.

17. The method of claim 16 and first additionally including the steps of:
  a) discriminating left-right movement at one spatial position when the difference or sum of the paired even- and odd-symmetric filters at time $t_1$ differs significantly from the difference or sum at time $t_2$; and,
  b) squaring the output of the paired filters to introduce a component at the difference frequency whereby the sign of the temporal gradient determines whether the test pattern moved to the right or moved to the left of the background's peak luminance.

18. The method of claim 17 and additionally including the steps of:
  a) detecting the contrast of each pattern component using filters tuned to spatial-frequencies having a bandwidth of 1 to 1½ octaves; and,
  b) employing a hyperbolic contrast response function such as that which optimally characterizes the contrast transducer function of normal observers and simple and complex cells in the striate cortex to predict the minimum contrast needed to discriminate the direction of movement.

19. The method of claim 18 wherein:
  the hyperbolic contrast transducer function is a nonlinear function that contains both a nonlinear power function for the contrast of the test pattern and thresholding factors.

20. In a machine vision system including a video camera having an input lens for viewing an area of interest and producing an analog signal at an output thereof reflecting a 2-dimensional area of interest being viewed by the input lens, an analog to digital converter connected to the output of the video camera for converting the analog signal into a binary signal, a digital buffer for storing the binary signal, and logic for analyzing the binary signal at times $t_1$ and $t_2$ to provide information about the contents of the area of interest, the method for determining movement in the area of interest by establishing the 2-dimensional velocity of objects and converting them into a 3-dimensional position and depth map comprising the steps of:
  a) horizontally scanning the area of interest to create a sequence of video images taken at small distance intervals so as to measure motion parallax or translational movement taking place in the area of interest; and,
  b) constructing the depth map by scene analysis using paired even- and odd-symmetric filters that are normalized Gabor filters, that comprise a cosine times a Gaussian and a sine times a Gaussian, the even- and odd-symmetric filters being oriented filters that compute both the smoothed contrast and the corresponding spatial gradient at each spatial position to provide two independent measures of the contrast differences in the area of interest, the paired filters being computed at several orientations and resolutions using a coarse-to-fine matching procedure;

wherein said step of scanning the area of interest includes the step of:
  dividing the area of interest into rectangular windows of attention determined by different object widths wherein closer occluding objects determine a maximum window of attention that can be used to view more distant object;
wherein;
  a) within each window of attention, the location that produces the maximum output of the paired even- and odd-symmetric filters at low resolutions that is above a pre-established threshold is used to determine the width of objects that are used to partition the area of interest into different depth regions with those objects being verified at higher resolution spatial scales;
  b) constructing the depth map using regions of constant velocity to construct each moving object's height and width and changes in the direction of movement relative to the video camera and other objects in the scene to infer the position of the objects in a three-dimensional scene such that the closer an object is to the video camera, the larger the distance transversed by the object in each video image of the scene; and,
  c) updating the depth map by minimizing deviations from expected changes in object boundaries at different depths over time.

21. The method of claim 20 and additionally including the steps of:
  a) scanning the area of interest until a first suprathreshold contrast difference is found;
  b) determining the motion parallax of objects moving within the area of interest; and,
  c) constructing the depth map using oriented paired filters analyzed over different windows of attention across the area of interest.

22. The method of claim 21 wherein;
the paired even- and odd-symmetric filters employed in step (c) include a nonlinear contrast transducer function that incorporates gain and threshold changes induced by different scene parameters, such as illumination, to normalize the output of the paired filters.

23. The method of claim 21 and additionally including the step of:
tuning the paired even- and odd-symmetric filters employed in step (c) in quadrature phase to a 90° spatial-phase difference.

24. The method of claim 21 wherein the paired even- and odd-symmetric filters employed in step (c) are separable spatial and temporal filters comprising:
  a) an even-symmetric Gabor function, $F_{ES}$, described as, $$F_{ES}(f,x,\sigma^2) = \cos(2\pi f x) e^{-(x-x_0)^2/2\sigma^2};$$

and,
  b) an odd-symmetric Gabor function, $F_{OS}$, described as, $$F_{OS}(f,x,\sigma^2) = \sin(2\pi f x) e^{-(x-x_0)^2/2\sigma^2}$$

,where f corresponds to the spatial-frequency of the pattern of the area of interest, x corresponds to the horizontal spatial position being examined, $x_o$ corresponds to the video camera's fixation point, and $\sigma^2$ corresponds to the variability within the pattern's spatial period in locating the position of the most salient contrast difference, $x_o$.

25. The method of claim 24 and additionally including the step of:
discriminating the direction an object moves relative to the background frame of reference at two different times whenever the sums and differences of outputs from the paired filters pooled across the background frame of reference exceeds a pre-established threshold.

26. The method of claim 24 wherein additionally:
a) the low-pass temporal filter $F_{ES}$ is described by, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_2$$

b) and the bandpass temporal filter $F_{OS}$ is described by, $$\sum_{x=x_o-B/2}^{x=x_o+B/2} \frac{k_j C_b^n + k_{fb}}{C_b^n + C_o} F_{ES}^m \pm \frac{k_i C_t^n + k_{ft}}{C_t^n + C_o} F_{OS}^m \text{ at time } t_1$$

, where $C_t$ corresponds to the contrast of a test pattern, $k_{ft}$ corresponds to the contrast threshold for a test frequency, $C_b$ corresponds to the contrast of the pattern of the background frame of reference, $k_{fb}$ corresponds to the contrast threshold for the frequencies of the background frame of reference, $C_o$, that depends on the temporal frequency, is a constant that corresponds to the signal-to-noise ratio used when detecting left-right movement of a test pattern relative to of the background frame of reference, n corresponds to the slope of the contrast response function, m is a constant, B corresponds to the spatial period of the background frame of reference, $x_o$ corresponds to a zero-crossing or contrast difference used as the point of reference to judge the direction the test pattern moved between two pattern presentations at times $t_1$ and $t_2$, and $k_i$, $k_j$ are changeable constants for the gain of the contrast sensitivity which may be changed by feedback.

27. The method of claim 20 and additionally including the steps of:
  a) filtering the binary signal from the digital buffer at times $t_1$ and $t_2$ to produce enhanced 2-dimensional binary representations of the area of interest at the times;
  b) producing smoothed versions of the enhanced 2-dimensional binary representations;
  c) processing the enhanced 2-dimensional binary representations to provided the spatial gradients of components thereof comprising a background frame of reference and components identified with objects moving against the background frame of reference;
  d) producing the temporal gradients of the enhanced 2-dimensional binary representations; and,
  e) comparing the spatial and temporal gradients at times $t_1$ and $t_2$ to one another to determine any motion parallax existing in the area of interest, whereby movement of objects in the area of interest is determined.

* * * * *